(12) United States Patent
Nakatani et al.

(10) Patent No.: US 11,800,034 B2
(45) Date of Patent: Oct. 24, 2023

(54) RECORDING MEDIUM, POWER SAVING CONTROL METHOD, AND SYSTEM

(71) Applicants: Yasuhito Nakatani, Kanagawa (JP); Masataka Yamazaki, Kanagawa (JP)

(72) Inventors: Yasuhito Nakatani, Kanagawa (JP); Masataka Yamazaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/657,649

(22) Filed: Apr. 1, 2022

(65) Prior Publication Data

US 2022/0329705 A1  Oct. 13, 2022

(30) Foreign Application Priority Data

Apr. 9, 2021 (JP) ................................. 2021-066675

(51) Int. Cl.
*H04N 1/00* (2006.01)
(52) U.S. Cl.
CPC ..... *H04N 1/00904* (2013.01); *H04N 1/00896* (2013.01)

(58) Field of Classification Search
None
See application file for complete search history.

(56) References Cited

U.S. PATENT DOCUMENTS

2016/0187955 A1\* 6/2016 Kawaura ............... G06F 1/3209
713/310

FOREIGN PATENT DOCUMENTS

JP   2002-359703   12/2002

\* cited by examiner

*Primary Examiner* — Lennin R Rodriguezgonzalez
(74) *Attorney, Agent, or Firm* — IPUSA, PLLC

(57) ABSTRACT

A non-transitory computer-readable recording medium stores a program executable by an information processing apparatus configured to communicate with a device including a first element and a second element, the second element being configured to receive power from a power source, and the first element being configured to receive the power from the power source via the second element. The program includes instructions that when executed by a processor of the information processing apparatus cause the information processing apparatus to control the second element such that the second element is maintained in a power state in which the second element supplies the power to the first element.

10 Claims, 14 Drawing Sheets

| PRINTER NAME | ABC PRINTER |
|---|---|
| MODEL | BASIC BW |
| SHARING | NOT SHARED |
| PORT | LPT/COM/USB/IP ADDRESS |
| ... | ... |

FIG.14

APPLICATIONS THAT USE SCANNER

| ID | NAMES OF APPLICATIONS |
|---|---|
| 1 | SCANNER-AND-PRINTER LINKAGE APPLICATION |
| 2 | SCANNER APPLICATION |
| 3 | ... |

RECORDING MEDIUM, POWER SAVING CONTROL METHOD, AND SYSTEM

CROSS-REFERENCE TO RELATED APPLICATION

The present application is based on and claims priority under 35 U.S.C. § 119 to Japanese Patent Application No. 2021-066675, filed on Apr. 9, 2021, the content of which is incorporated herein by reference in its entirety.

BACKGROUND OF THE INVENTION

1. Field of the Invention

The present disclosure relates to a recording medium, a power state control method, and a system.

2. Description of the Related Art

Conventional devices such as multi-function peripherals perform power-saving control to stop supplying power to some of the functions when no operation is performed for a certain period of time.

SUMMARY OF THE INVENTION

According to an aspect of an embodiment of the present disclosure, provided is a non-transitory computer-readable recording medium that stores a program executable by an information processing apparatus configured to communicate with a device including a first element and a second element, the second element being configured to receive power from a power source, and the first element being configured to receive the power from the power source via the second element. The program includes instructions that when executed by a processor of the information processing apparatus cause the information processing apparatus to control the second element such that the second element is maintained in a power state in which the second element supplies the power to the first element.

BRIEF DESCRIPTION OF THE DRAWINGS

FIG. 14 is a diagram illustrating an example of a list of applications that use a scanner.

DETAILED DESCRIPTION OF THE PREFERRED EMBODIMENTS

Figure 1:
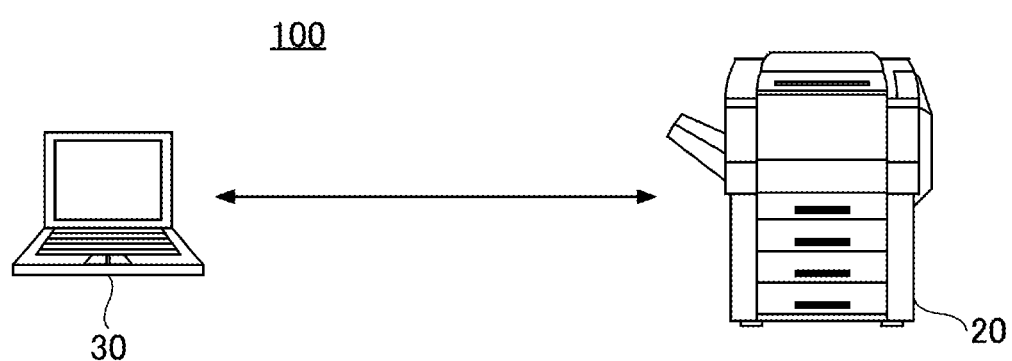
FIG. 1 is a system configuration diagram of an example of a device system.

Conventional devices such as multi-function peripherals perform power-saving control to stop supplying power to some of the functions when no operation is performed for a certain period of time. Furthermore, for example, Japanese Unexamined Patent Application Publication No. 2002-359703 discloses a device having multiple functions, such as a scanner and a printer, that can achieve power-saving control according to used functions. Specifically, in a power-saving control method, the output destination of a power-saving cancellation signal is controlled according to a copy mode, a facsimile mode, a printer mode, or a scanner mode that is used by a user.

However, such a conventional technique has a problem in that the power may not be supplied to a first element of a device when the power state of a second element of the device falls below a certain level. Specifically, for example, the device may include a scanner (i.e., the first element) and a printer (i.e., the second element) that supplies power to the scanner, and when the power state of the printer falls below the certain level, the printer may stop supplying power to the printer. In this case, while the scanner is being used, the power state of the printer may fall below the certain level, which cuts off the supply of power to the scanner that is being used by the user.

If a scanner is directly connected to a power source to independently receive power, power-saving recovery can be performed in response to a document placed on a platen or a feeder, or power-saving recovery can be performed in response to pressing of a hard key for a scanner function provided on an operation panel. However, in the device in which the printer (i.e., the second element) supplies power to the scanner (i.e., the first element), the above-described power-saving recovery is difficult to be performed when the power state of the printer falls below the certain level.

Accordingly, it is desired to provide a recording medium storing a program with which a first element is less likely to lose supply of power.

According to an aspect of an embodiment of the present disclosure, provided is a non-transitory computer-readable recording medium that stores a program executable by an information processing apparatus configured to communicate with a device including a first element and a second element, the second element being configured to receive power from a power source, and the first element being configured to receive the power from the power source via the second element. The program includes instructions that when executed by a processor of the information processing apparatus cause the information processing apparatus to control the second element such that the second element is maintained in a power state in which the second element supplies the power to the first element.

Hereinafter, a device control application and a power state control method that is performed by the device control application are explained, as an embodiment for carrying out the present disclosure, with reference to drawings.

First Embodiment

In the present embodiment, the power state of a printer in a device such as an image forming apparatus is controlled by a device control application that runs on a terminal apparatus. In order to prevent the scanner from being cutting off from power, the device control application maintains the printer in a power state for supplying power to the scanner (or a power state that is equal to or higher in power usage than such a power state). Therefore, the scanner is less likely to be in the OFF state when the user needs to use the scanner. For example, while the user is using the scanner, the scanner is less likely to enter the power-saving mode to cut off the power source for the scanner that is being used by the user. Power saving recovery can be performed in response to a document placed on a platen or a feeder, or power-saving recovery can be performed in response to pressing of a hard key for the scanner function provided on the operation panel.

<Terminology>

For example, a power source is a commercial power source of an alternating current, but may be a primary battery, a secondary battery, or the like.

A power state means an operation mode with a different power consumption with respect to a device operating in a power-saving mode. Two or more power states may be provided.

A first element and a second element may be elements that require power. Alternatively to the elements explained in the present embodiment, for example, the second element may be a basic element of a device, and the first element may be charging from a universal serial bus (USB) interface, illumination, or the like.

<System Configuration Example>

First, a system configuration of a device system 100 according to the present embodiment is explained with reference to FIG. 1. FIG. 1 is a system configuration diagram of the device system 100. The device system 100 as illustrated in FIG. 1 includes a device 20 and a terminal apparatus 30.

The device 20 is, for example, a multi-function peripheral, a multifunction peripheral (MFP), 2C or the like that is used by a user. The device 20 includes at least a printer and another element different from the printer. In the present embodiment, for example, the another element is a scanner. Alternatively, the another element may be a facsimile function, instead of the scanner. Still alternatively, the device 20 includes both of the scanner and the facsimile functions. The device 20 may also be referred to as an image forming apparatus, a printing apparatus, a printer, a scanner apparatus, or the like.

The device 20 may have two or more elements including a first element and a second element, the first element being connected to a power supply via the second element, and the second element being connected to the power supply. For example, the device 20 may be an interactive whiteboard (IWB) or the like including a printer that receives power from a whiteboard.

The terminal apparatus 30 is a general-purpose information processing apparatus. For example, the terminal apparatus 30 is a desktop personal computer (PC), a notebook PC, a smartphone, a tablet terminal, or the like that is used by the user. Also, an application, explained later, that communicates with the device 20 may run on the terminal apparatus 30.

The device 20 and the terminal apparatus 30 are connected via a network such as a LAN, a communication cable such as a universal serial bus (USB), or the like. The device 20 and the terminal apparatus 30 may be connected by a Centronics interface, an RS-232C interface, or the like, instead of the USB. The details of connection method are explained later.

<Hardware Configuration Example>

A hardware configuration of the terminal apparatus 30 and the printer unit of the device 20 provided in the device system 100 according to the present embodiment is explained with reference to FIG. 2 and FIG. 3.

<<Terminal Apparatus>>

Figure 2:
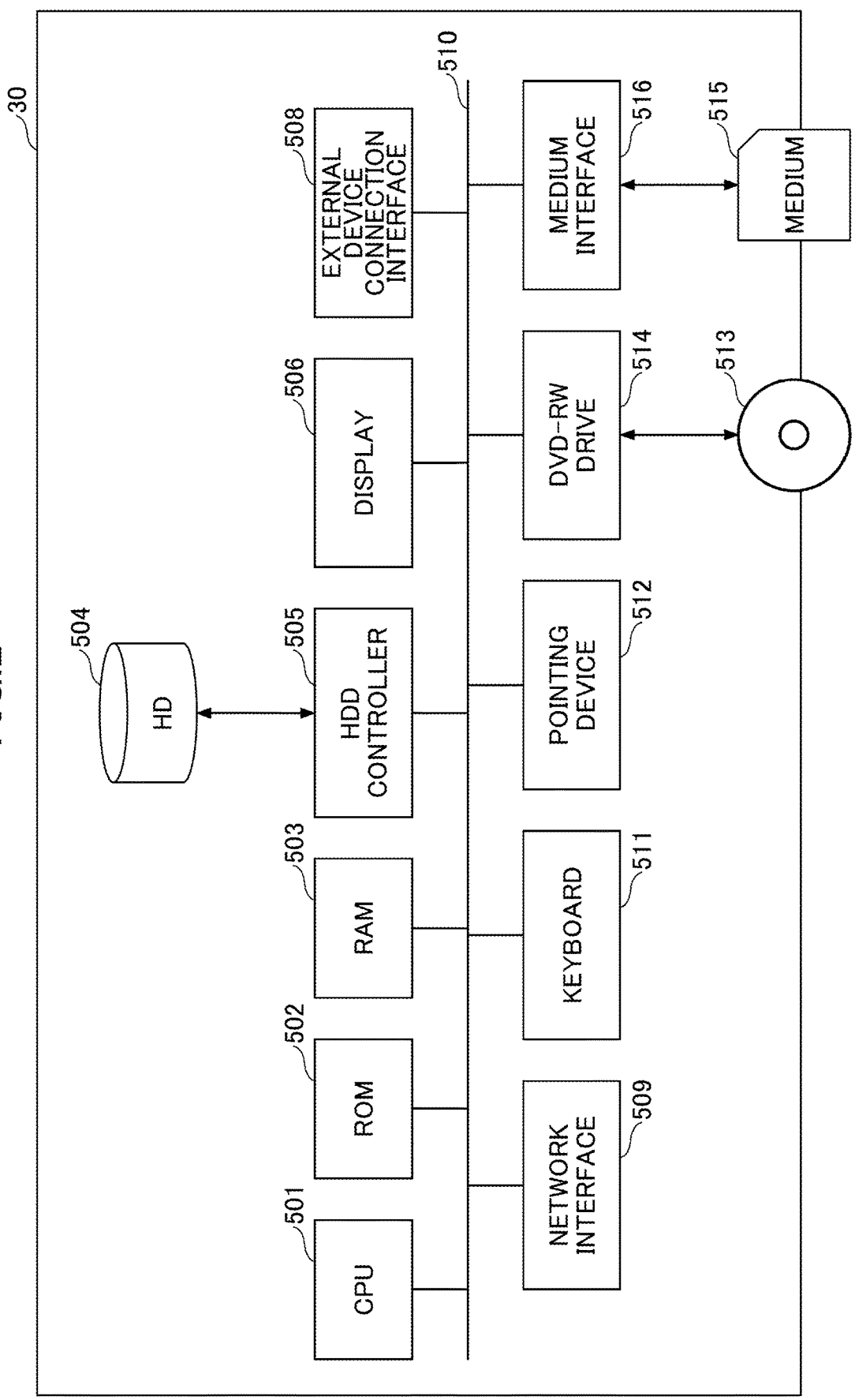
FIG. 2 is a hardware configuration diagram of an example of a terminal apparatus.

FIG. 2 is a diagram illustrating a hardware configuration of an example of the terminal apparatus according to the present embodiment. As illustrated in FIG. 2, the terminal apparatus 30 is constituted by a computer, and includes a central processing unit (CPU) 501, a read-only memory (ROM) 502, a random access memory (RAM) 503, a hard disk drive (HDD) 504, a hard disk drive controller (HDD controller) 505, a display 506, an external device connection interface (I/F) 508, a network interface 509, a bus line 510, a keyboard 511, a pointing device 512, a digital versatile disk rewritable (DVD-RW) drive 514, and a medium interface 516.

Among them, the CPU 501 controls the overall operation of the terminal apparatus 30. The ROM 502 stores programs used to drive the CPU 501 such as an initial program loader (IPL). The RAM 503 is used as a work area for the CPU 501. The HDD 504 stores various data such as programs. The HDD controller 505 controls reading or writing of data from or to the HDD 504 according to the control of the CPU 501. The display 506 displays various kinds of information such as a cursor, menus, windows, characters, or images. The external device connection interface 508 is an interface for connecting various kinds of external devices. In this case, the external device is, for example, a universal serial bus (USB) memory, a printer, and the like. The network interface 509 is an interface for performing data communication using the network N2. The bus line 510 is, for example, an address bus, a data bus, and the like for electrically connecting components such as the CPU 501 as illustrated in FIG. 2.

The keyboard 511 is a type of input means having a plurality of keys for inputting characters, numerical values, various instructions, and the like. The pointing device 512 is a type of input means for selecting and executing various instructions, selecting a processing target, moving a cursor, and the like. The DVD-RW drive 514 controls reading or writing of various kinds of data from or to a DVD-RW 513 as an example of a removable recording medium. It should be noted that the removable recording medium is not limited to the DVD-RW, and may be a DVD-R or the like. The medium interface 516 controls reading or writing (storing) of data from or to a recording medium 515 such as a flash memory.

<<Printer Unit of Device>>

Figure 3:
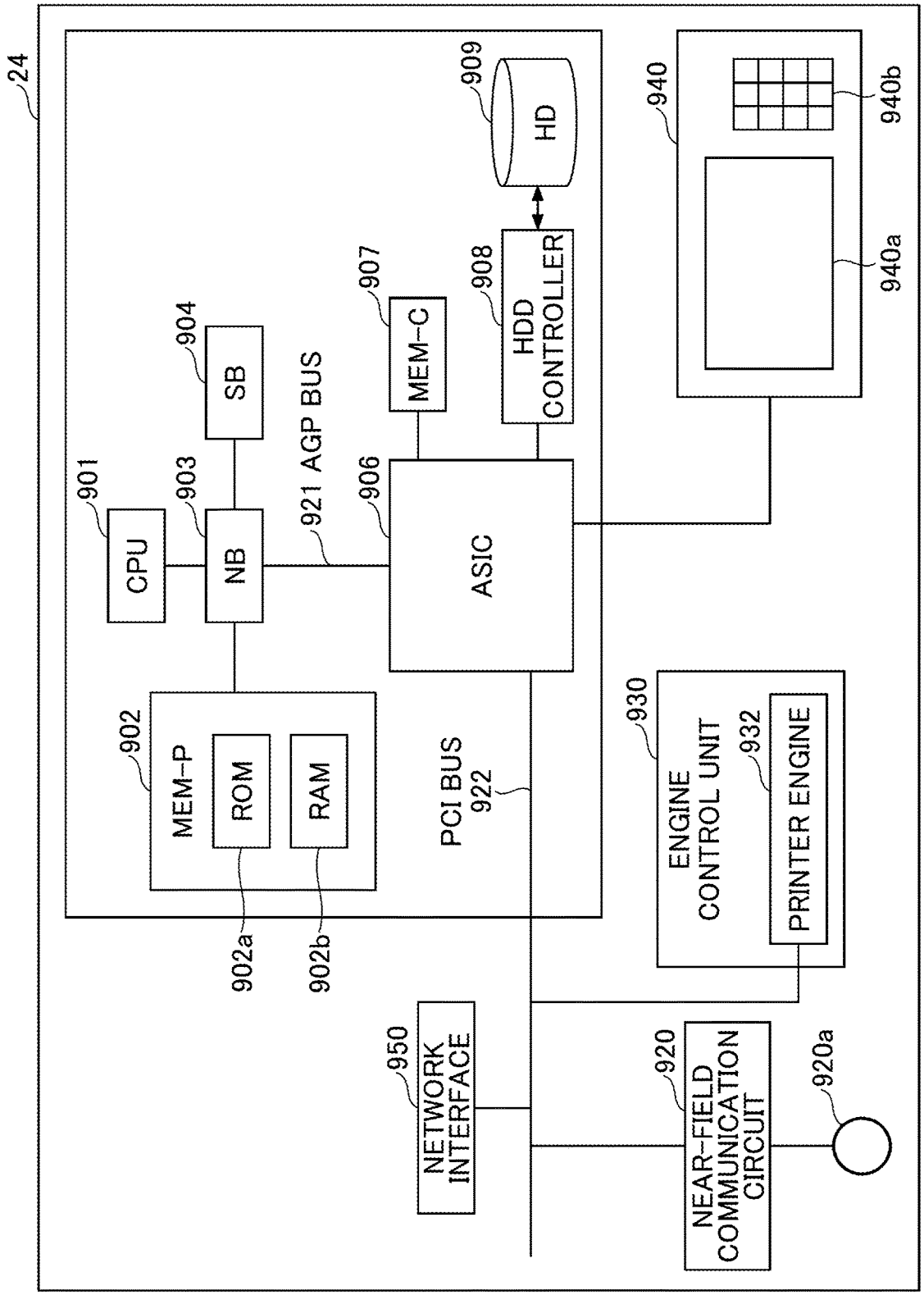
FIG. 3 is a hardware configuration diagram of an example of a printer unit.

FIG. 3 is a hardware configuration diagram of the printer unit 24 of the device 20. As illustrated in FIG. 3, the printer unit 24 includes a controller 910, a near-field communication circuit 920, an engine control unit 930, an operation panel 940, and a network interface 950.

Among them, the controller 910 includes a CPU 901, a system memory (MEM-P) 902, a north bridge (NB) 903, a south bridge (SB) 904, an application specific integrated circuit (ASIC) 906, a local memory (MEM-C) 907 that is a storage unit, a hard disk drive (HDD) controller 908, and a hard disk drive (HDD) 909 that is a storage unit, all of which are main components of the computer, and is configured such that an accelerated graphics port (AGP) bus 921 connects the NB 903 and the ASIC 906.

Among them, the CPU 901 is a control unit that controls the entirety of the printer unit. The NB 903 is a bridge for connecting the CPU 901, the MEM-P 902, the SB 904, and the AGP bus 921. The NB 903 includes a memory controller for controlling reading and writing of the MEM-P 902, and also includes a peripheral component interconnect (PCI) master and an AGP target.

The MEM-P 902 includes a ROM 902a and a RAM 902b. The ROM 902a is a memory for storing programs and data for implementing the functions of the controller 910. The RAM 902b is used as a memory to which programs and data are extracted and as a rendering memory during memory printing. The programs stored in the RAM 902b may be provided in a form of an installable or executable file recorded on a computer-readable recording medium such as a CD-ROM, a CD-R, or a DVD.

The SB 904 is a bridge for connecting the NB 903 to PCI devices and peripheral devices. The ASIC 906 is an integrated circuit (IC) for image processing that has hardware elements for image processing, and serves as a bridge that connects the AGP bus 921, the PCI bus 922, the HDD controller 908, and the MEM-C 907. The ASIC 906 includes the PCI master, the AGP target, an arbiter (ARB) that forms the core of the ASIC 906, a memory controller that controls the MEM-C 907, and a plurality of DMACs (Direct Memory Access Controllers) that rotate image data using hardware logic and the like, and also includes a PCI unit that performs data transfer with a printer engine 932 via the PCI bus 922. The ASIC 906 may include a universal serial bus (USB) interface or an IEEE 1394 (Institute of Electrical and Electronics Engineers 1394) interface, and may be connected thereto.

The MEM-C 907 is a memory used as an image buffer for copying and as a code buffer. The HDD 909 is a storage for storing image data, storing font data used for printing, and storing forms. The HDD controller 908 controls reading or writing of data from or to the HDD 909 according to the control of the CPU 901. The AGP bus 921 is a bus interface for a graphics accelerator card that has been proposed to speed up graphics processing. The AGP bus 921 can accelerate the graphics accelerator card by directly accessing the MEM-P 902 at a high throughput.

The near-field communication circuit 920 includes an antenna 920a of the near-field communication circuit. The near-field communication circuit 920 is a communication circuit for NFC (Near Field Communication) and Bluetooth (registered trademark).

Further, the engine control unit 930 includes the printer engine 932. The operation panel 940 includes a panel display unit 940a and an operation panel 940b. The panel display unit 940a is, for example, a touch panel and the like for displaying current setting values, a selection screen, and the like, and receiving an input from a user. The operation panel 940b includes, for example, numeric keys for receiving setting values of conditions for image forming such as a setting condition of a density, a start key for receiving a copy start instruction, and the like. The controller 910 controls the entirety of the printer unit and controls, for example, rendering, communication, input from the operation panel 940, and the like. The printer engine 932 includes image processing portions for error diffusion, gamma conversion, and the like.

The network interface 950 is an interface for performing data communication using the network N2. The near-field communication circuit 920 and the network interface 950 are electrically connected to the ASIC 906 via the PCI bus 922.

<Configuration of Hardware Function of Device>

Figure 4:
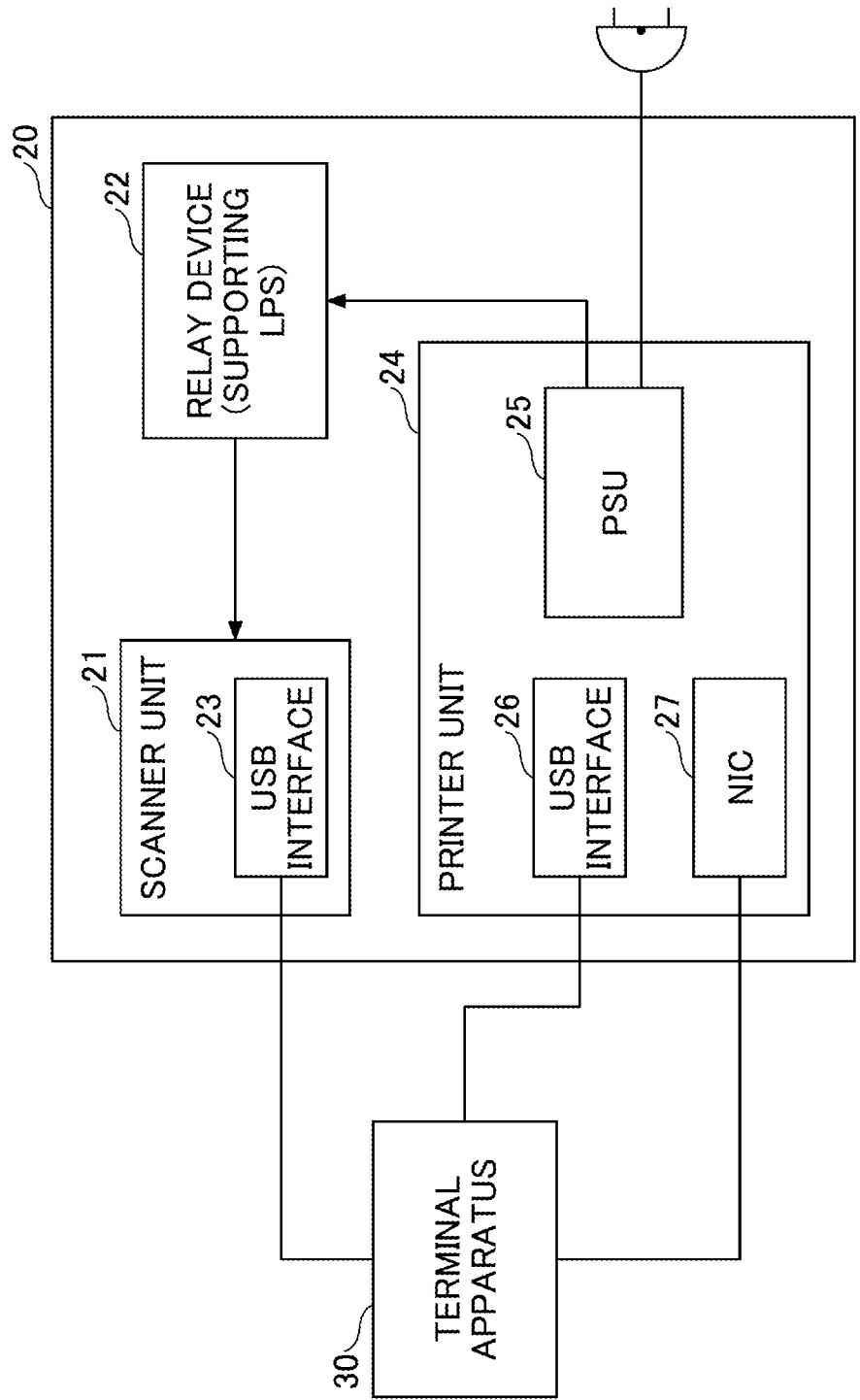
FIG. 4 is a diagram illustrating an example of hardware functions of a device.

FIG. 4 illustrates an example of the hardware functions of the device 20. The hardware functions are achieved by hardware of the device 20. Alternatively, the hardware functions may be achieved by software that runs on the hardware of the device 20.

As illustrated in FIG. 4, the device 20 includes a scanner unit 21, a printer unit 24, and a relay device 22. In addition, other hardware elements (for example, a facsimile machine and the like) may be provided, but are omitted in FIG. 4.

The scanner unit 21 and the printer unit 24 are hardware elements that operate independently, and are provided in a single housing of the device 20. Therefore, the scanner unit 21 and the printer unit include USB interfaces 23 and 26, respectively, and the printer unit 24 further includes a network information card (NIC) 27. The scanner unit 21 may further include a NIC. A cable may be connected to either the USB interface 26 or the NIC 27 of the printer unit 24. In a case where cables are connected to both of the USB interface 26 and the NIC 27, the device control application 32 uses an interface with a higher priority defined in advance.

As illustrated in FIG. 4, a power supply unit (PSU) 25 is integrally provided with the printer unit 24. The PSU 25 converts an alternating current to a direct current at a predetermined voltage. Only the printer unit 24 can control the integrated PSU 25, and the printer unit 24 provides power to the scanner unit 21. The state of the PSU 25 (for example, whether the PSU 25 supplies power to the scanner unit 21) is determined by the power state of the printer unit 24. According to the specification of the PSU 25, when the printer unit 24 changes to a power-saving mode that is equal to or lower than a certain level, the supply of power to the scanner unit 21 is stopped.

The power state of the printer unit 24 can be different depending on devices, but in the present embodiment, for example, the power state of the printer unit 24 is assumed to change as follows. The following is merely an example, and there may be at least two or more power states (i.e., a power state for supplying power to the scanner unit 21 and a power state for stopping the supply of power to the scanner unit 21).

Standby state→power-saving state→quiet state→engine OFF state→STR (suspend) state The energy consumption decreases in this order.

Standby state is a state in which all the functions of the printer unit 24 are available.

Power-saving state is, for example, a state in which the operation panel of the printer unit 24 is turned off, a state in which the clock speed of the CPU is reduced, and the like.

Quiet state is a state in which a cooling fan is stopped or rotating at a low speed.

Engine OFF state is a state in which the power of the fixing apparatus is turned OFF.

Suspend state is a state in which components other than the main memory (RAM) are not energized, and the functions are stopped while the content in the memory is maintained.

The PSU 25 stops supply of power to the scanner unit 21 when the printer unit 24 is in a power-saving mode that is equal to or lower than the engine OFF state (the PSU 25 supplies power to the scanner unit 21 in a standby state, a power-saving state, and a quiet state).

The relay device 22 distributes the power converted by the PSU 25 to each hardware function. The relay device 22 includes a limited power source (LPS). The LPS is a function for limiting currents. In order to prevent an overcurrent from flowing into the PSU 25 from the scanner unit 21 and the like, a fuse or the like is provided in the LPS of the relay device 22, so that an overcurrent is less likely to flow into the PSU 25.

<Applications and the Like Operating on Terminal Apparatus>

Figures 5, 6:
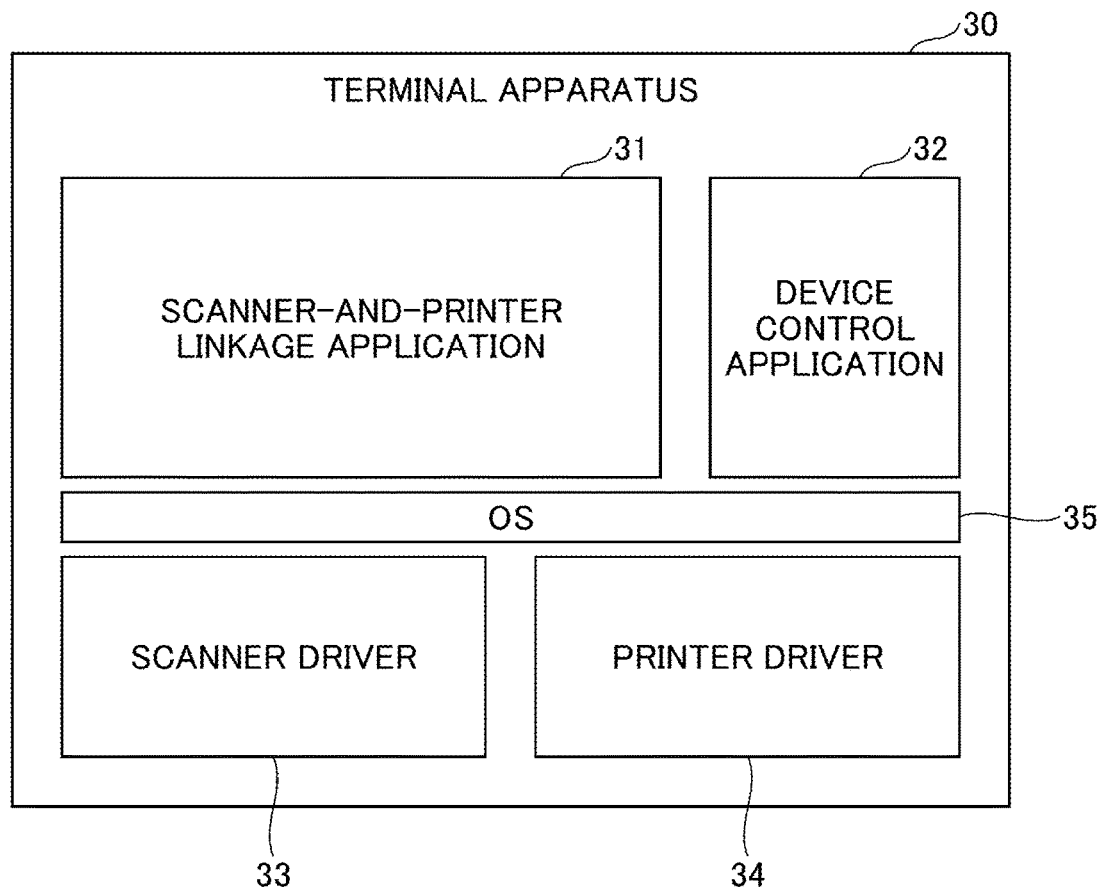
FIG. 5 is a diagram for explaining applications and device drivers that operate on the terminal apparatus.
FIG. 6 is a diagram illustrating an example of configuration information of a printer that is set when the printer driver is installed.

Next, applications and the like operating on the terminal apparatus 30 are explained with reference to FIG. 5. FIG. 5 is a diagram for explaining applications and device drivers that run on the terminal apparatus 30. An operating system (OS) 35 such as Windows (registered trademark) is installed to the terminal apparatus 30 according to the present embodiment, and a scanner-and-printer linkage application 31 and a device control application 32 (examples of programs) operate on the OS 35. The scanner-and-printer linkage application 31 and the device control application 32 may be distributed from a program distribution server, or may be distributed in a storage medium such as a USB memory or the like.

The scanner-and-printer linkage application 31 and the device control application 32 do not have to be separate applications, and may be combined into a single application. The device control application may be installed automatically when the scanner-and-printer linkage application 31 is installed, or may be installed independently.

The scanner-and-printer linkage application 31 provides the user with the function of the scanner unit 21 and the function of the printer unit 24 separately, or provides the user with the function that is obtained by linking the scanner unit 21 and the printer unit 24. The scanner-and-printer linkage application 31 is an application that displays a screen and receives operations such as configurations of scan conditions and printing conditions from the user. For example, the scanner-and-printer linkage application 31 can provide a copy function as a function that is obtained by linking the scanner unit 21 and the printer unit 24.

The device control application 32 is an application that is not operated by the user except when the user performs configuration of the device 20. The device control application 32 is a resident-type application that automatically starts to run when the terminal apparatus 30 is turned ON. The device control application 32 checks the power state of the printer unit 24 so that the supply of power to the scanner unit 21 is not stopped, and controls the power state of the printer unit 24 so that the power state of the printer unit 24 does not transition to a power-saving mode that is equal to or lower than a certain level (i.e., a power-saving mode that is equal to or lower than the engine OFF state in which the PSU 25 does not provide power to the scanner unit 21). In other words, the device control application 32 maintains the printer unit 24 in a power state that is equal to or higher in power usage than a certain level (i.e., equal to or higher in power usage than the quiet state) in which the supply of power to the scanner unit 21 is not stopped.

Also, the scanner driver 33 and the printer driver 34 are installed to the terminal apparatus 30. The scanner driver 33 and the printer driver 34 are installed to the terminal apparatus 30 with plug and play (PnP) or the like. Specifically, when the printer unit 24 in the ON state is connected to the terminal apparatus 30 via a USB cable or a LAN cable, the printer driver 34 corresponding to the printer unit 24 is installed. When the scanner unit 21 in the ON state is connected to the terminal apparatus 30 via a USB cable or a LAN cable, the scanner driver 33 corresponding to the scanner unit 21 is installed. When one of the scanner driver 33 and the printer driver 34 is installed, the other of the scanner driver 33 and the printer driver 34 may be installed together.

The scanner driver 33 obtains a document image by controlling the scanner unit 21 according to a scan condition that is configured by the user with the scanner-and-printer linkage application 31. The printer driver 34 prints an image on a sheet by controlling the printer unit 24 according to a printing condition that is configured by the user with the scanner-and-printer linkage application 31.

<Configuration Information of Printer>

FIG. 6 is an example of configuration information of the printer that is automatically configured or that is configured by the user when the printer driver 34 is installed. Hereinafter, each item of the configuration information of the printer is explained. FIG. 6 merely shows major items, and the configuration information includes many other items. The user associates the configuration information with the device control application 32.

Printer name is the name of a printer with which the user selects the printer on the terminal apparatus 30. The user may set the printer name, or the printer name may be determined automatically.

Model is a model number or the like of the printer, and corresponds to the name of the printer driver 34. Usually, the model is automatically input. Alternatively, the model may be set by the user.

Sharing indicates whether the printer is shared by other users. This can be set by the user.

Port indicates which interface of the terminal apparatus 30 the printer is connected to. LPR indicates a parallel connection, COM indicates a serial connection, USB indicates a connection using a USB cable, and an IP address indicates a network (LAN) connection. The user may set the port, or the port may be determined automatically.

<Function>

Figure 7:
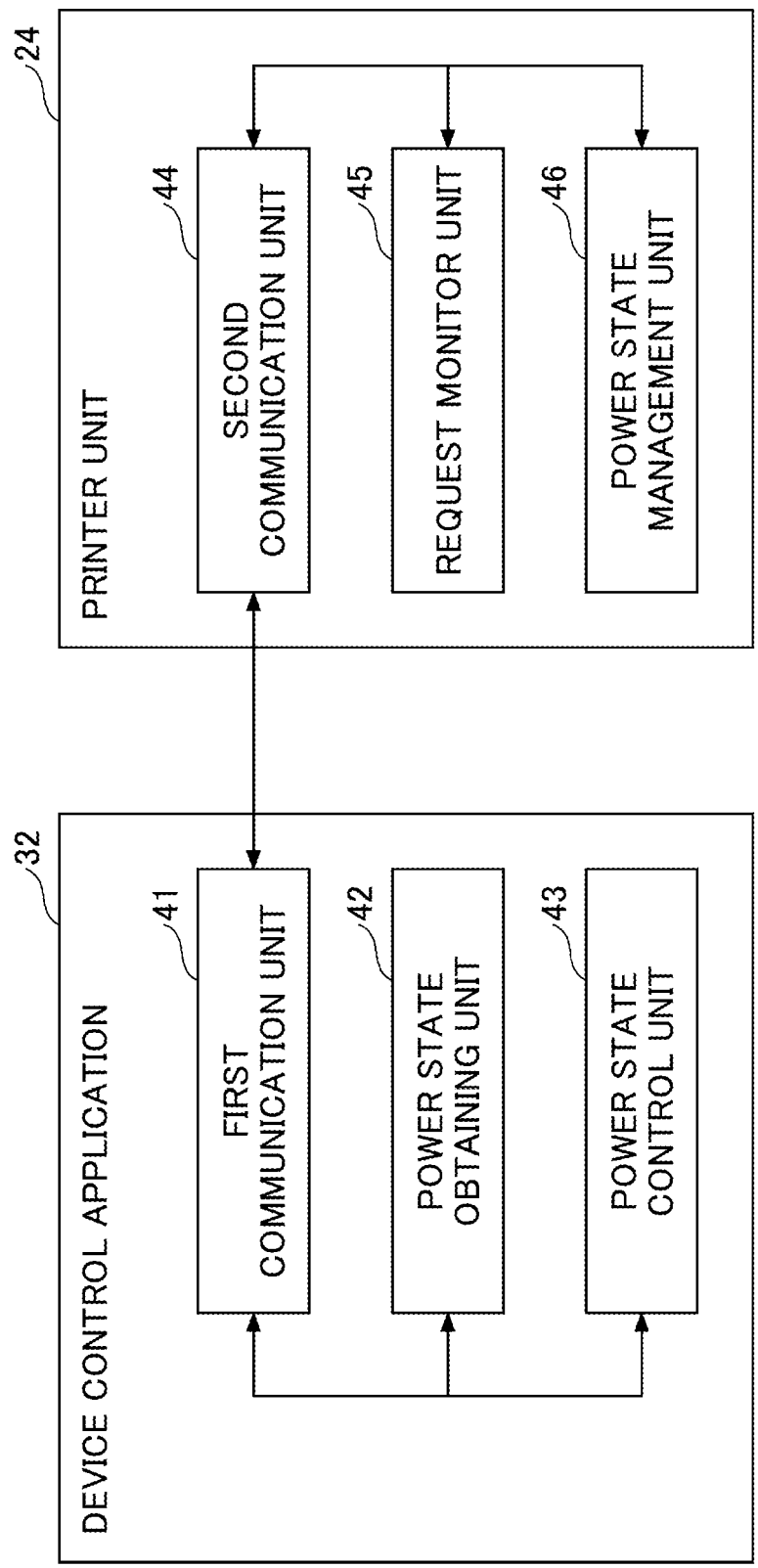
FIG. 7 is a diagram illustrating a functional configuration of an example of a printer unit and a device control application.

Next, the functional configuration of the device system 100 according to the present embodiment is explained with reference to FIG. 7. FIG. 7 is a diagram illustrating a functional configuration of an example of the printer unit 24 and the device control application 32 according to the present embodiment.

<<Device Control Application>>

First, the device control application 32 includes a first communication unit 41, a power state obtaining unit 42, and a power state control unit 43, which are the functions or means that are achieved by causing the CPU 501 to execute instructions included in the device control application 32 installed in the terminal apparatus 30 (the CPU 501 may also use the functions of the printer driver 34).

The first communication unit 41 communicates with the printer unit 24 via the network or the USB cable. The communication method is different according to whether the terminal apparatus and the printer unit 24 are connected via a network or via a USB cable. In either case, the first communication unit 41 communicates with the printer unit 24 to set information to the management information base (MIB) of the printer unit 24 or read (obtain) information from the MIB. The information stored in the MIB is distinguished by an identifier referred to as an object identifier (OID). The first communication unit 41 can transmit and receive required information by setting and obtaining information by designating the OID.

In the case where the connection is made via the network, the first communication unit 41 can communicate by using the SNMP (Simple Network Management Protocol) by which the device control application 32 accesses the MIB. In the case where the connection is made via the USB cable, for example, the first communication unit 41 accesses the MIB by encapsulating communication data of the SNMP in the format of the USB serial communication. In the explanation about the present embodiment, the connection is assumed to be made mainly via the network.

The power state obtaining unit 42 obtains the current power state from the printer unit 24 via the first communication unit 41. For example, the power state obtaining unit 42 can obtain any one of the standby state, the power-saving state, the quiet state, the engine OFF state, and the STR state.

The power state control unit 43 controls the power state of the printer unit 24 (the PSU 25) via the first communication unit 41. Among the controls of the power state, a control to the standby state is referred to as standby recovery.

<<Printer Unit>>

The printer unit 24 includes a second communication unit 44, a request monitor unit 45, and a power state management unit 46. Similarly to the first communication unit 41, the second communication unit 44 communicates with the device control application 32 via the MIB. Even when the printer unit 24 is in the STR state, the second communication unit 44 can communicate with the device control application 32. For example, the second communication unit 44 transmits the power state that is set in the MIB to the device control application 32.

A request from the device control application 32 is written to the MIB, and accordingly, the request monitor unit 45 monitors the state of the MIB. The request monitor unit 45 transmits the information written in the MIB to the second communication unit 44 or the power state management unit 46.

The power state management unit 46 manages the power state of the printer unit 24. Every time a certain period of time counted by the timer elapses since the end of a user operation or since the completion of execution of a job, the power state management unit 46 causes the power state to transition to the standby state, the power-saving state, the quiet state, the engine OFF state, and the STR state. The certain periods of time, upon which the power state makes a transition, may be the same or may be different from each other. In any power state, when the second communication unit 44 receives a job from the terminal apparatus 30 or when the user operates the device 20, the power state management unit 46 returns the power state back to the standby state. Furthermore, the power state management unit controls the power state of the printer unit 24 according to a request from the device control application 32.

<State Transition of Device Control Application>

Figure 8:
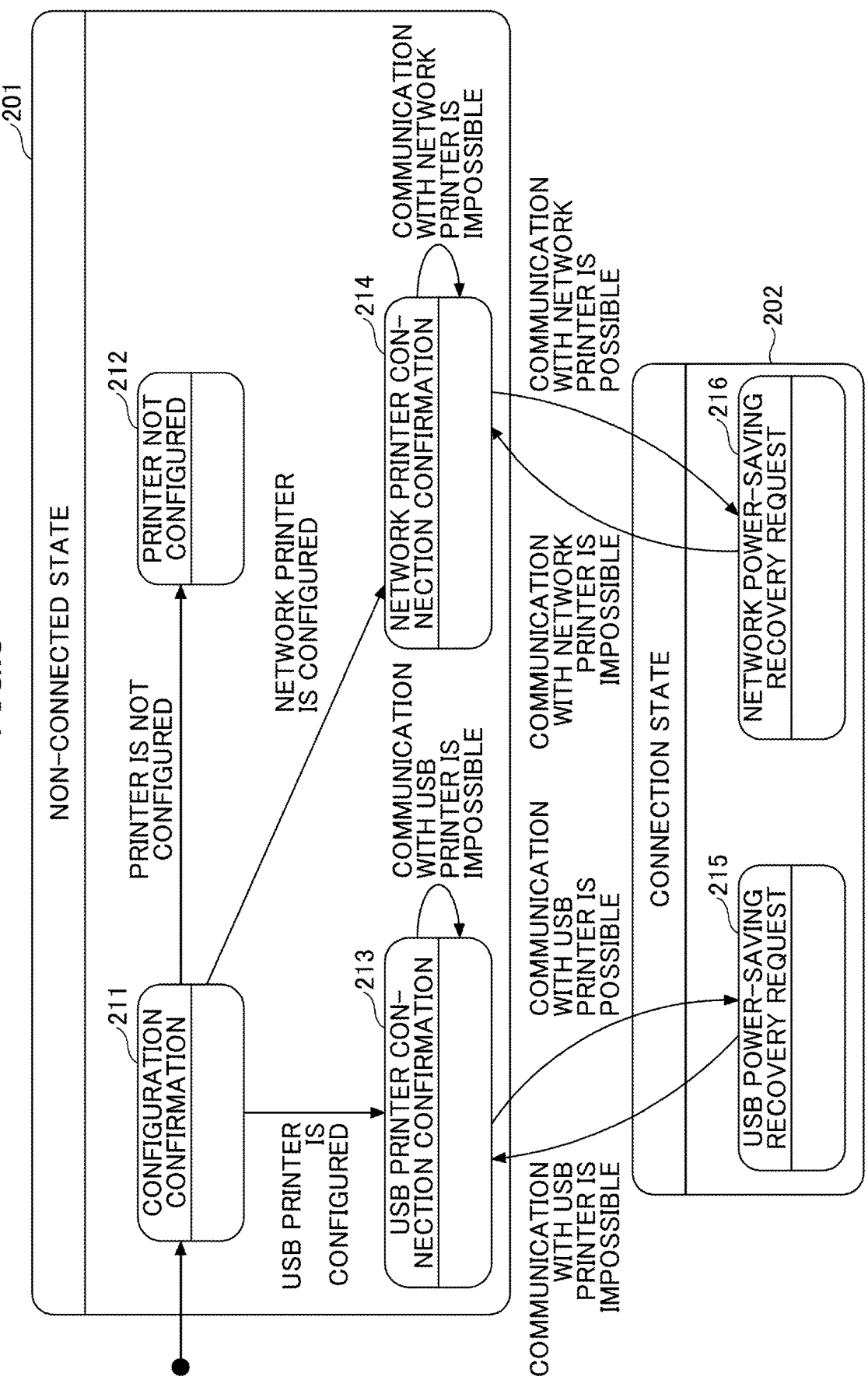
FIG. 8 is an example of a state transition diagram of the device control application.

The state transition of the device control application 32 is explained with reference to FIG. 8. FIG. 8 is an example of a state transition diagram of the device control application 32. First, the device control application 32 can be either in a non-connected state 201 or in a connected state 202.

The non-connected state 201 is a state in which the printer is not connected to the terminal apparatus 30 (i.e., a state in which the cable is not connected, or a state in which the cable is connected but communication cannot be performed). The connected state 202 is a state in which the printer is connected to the terminal apparatus 30 and communication can be performed.

The state of the device control application 32 starts from a configuration confirmation state 211. The configuration confirmation state 211 is a state in which the configuration information of the printer has not yet been read out that occurs immediately after the start of the device control application 32, or a state that occurs immediately after the configuration is changed. When the device control application 32 transitions to a state according to the configuration information of the printer, the device control application 32 performs the transition through this configuration confirmation state 211. Specifically, when the device control application 32 starts to run, the device control application 32 transitions to the configuration confirmation state 211, reads the configuration information of the printer, and transitions to a state according to the configuration information.

Furthermore, in a case where the configuration information is changed, the device control application 32 transitions to the configuration confirmation state 211, regardless of the current state, and transitions to a state according to the new configuration information.

In the configuration confirmation state 211, when it is determined that the printer is not configured in the device control application 32 (i.e., there is no configuration information), the configuration confirmation state 211 transitions to a printer unconfigured state 212. The printer unconfigured state 212 is a state in which a printer is not configured in the device control application 32.

In the configuration confirmation state 211, when it is determined that the USB printer is configured (i.e., a USB is configured in the port), the configuration confirmation state 211 transitions to a USB printer connection confirmation state 213. The USB printer connection confirmation state 213 is a state in which communication is attempted to be performed with the MIB of the printer unit 24 via the USB cable with regular intervals (for example, every 10 seconds).

In the configuration confirmation state 211, when it is determined that the network printer is configured (i.e., an IP address is configured in the port), the configuration confirmation state 211 transitions to a network printer connection confirmation state 214. The network printer connection confirmation state 214 is a state in which communication with the MIB of the printer unit 24 via the network is attempted with regular intervals (for example, every 10 seconds).

When communication with the USB printer is successfully performed in the USB printer connection confirmation state 213, the device control application 32 transitions from the USB printer connection confirmation state 213 to a USB power-saving recovery request state 215. The USB power-saving recovery request state 215 is a state in which the device control application 32 transmits a power-saving recovery request to the printer unit 24 via the USB cable. After the device control application raises the power state of the printer to the standby state, the device control application 32 transmits a quiet state keep request. When communication with the MIB of the printer unit 24 fails due to an error in the USB power-saving recovery request state 215, the device control application 32 transitions from the USB power-saving recovery request state 215 to the USB printer connection confirmation state 213.

When communication with the network printer is successfully performed in the network printer connection confirmation state 214, the device control application 32 transitions from the network printer connection confirmation state 214 to a network power-saving recovery request state 216. The network power-saving recovery request state 216 is a state in which the device control application 32 transmits a power-saving recovery request to the printer unit 24 via the network. After the device control application 32 raises the power state of the printer to the standby state, the printer unit 24 transmits a quiet state keep request. When communication with the MIB of the printer unit 24 fails due to an error in the network power-saving recovery request state 216, the device control application 32 transitions from the network power-saving recovery request state 216 to the network printer connection confirmation state 214.

<Operation Procedure>

Figure 9:
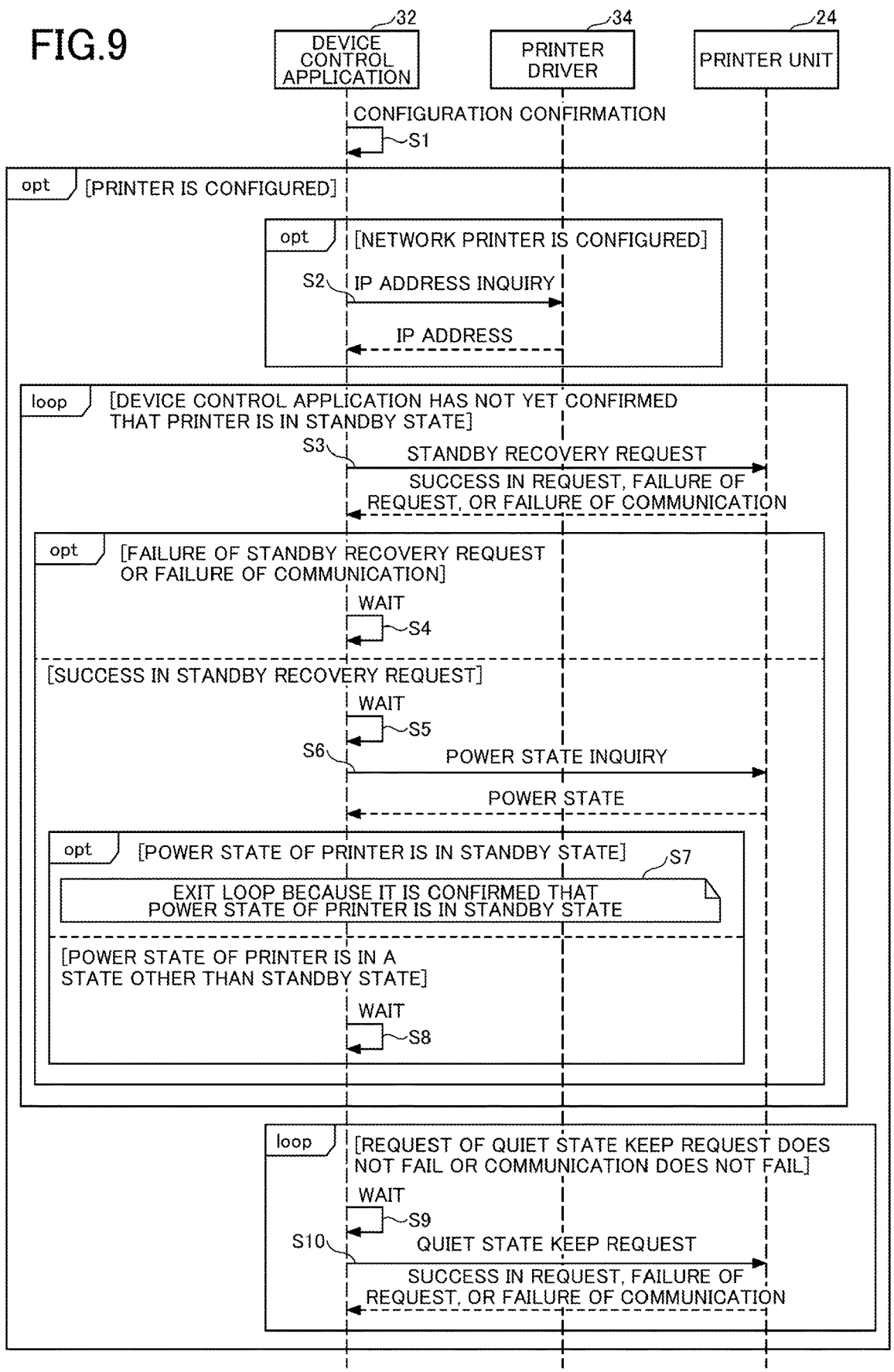
FIG. 9 is an example of a sequence diagram in which the device control application controls the power state of the printer.

FIG. 9 is an example of a sequence diagram according to which the device control application 32 controls the power state of the printer.

When the user starts the terminal apparatus 30, the device control application 32 automatically starts to run. In a case where the device control application 32 is not running, the user may start the device control application 32.

S1: The device control application 32, which has been started to run, is in the configuration confirmation state 211, and accordingly, the power state control unit 43 confirms the configuration information of the printer. In this case, it is assumed that a USB or an IP address (indicating a network printer) is configured in the port of the configuration information. Then, the device control application 32 transitions to the USB printer connection confirmation state 213 or the network printer connection confirmation state 214.

S2: In a case where the device control application 32 is in the network printer connection confirmation state 214, the IP address of the printer unit 24 is required. Accordingly, the power state control unit 43 of the device control application 32 sends an inquiry for the IP address of the printer unit 24 to the printer driver 34. Although, in FIG. 9, the power state control unit 43 transmits an inquiry for the IP address to the printer driver 34, the power state control unit 43 may obtain the IP address from the configuration information. Alternatively, the power state control unit 43 may obtain the IP address of the printer unit 24 from the registry of the OS 35.

In a case where the first communication unit 41 of the device control application 32 can communicate with the printer unit 24, the device control application 32 transitions to the USB power-saving recovery request state 215 or the network power-saving recovery request state 216.

Next, in steps S3 to S8, the power state control unit 43 returns the power state of the printer unit 24 to the standby state. This is to confirm that there is no abnormality in the power control. In a case where the power state of the printer unit 24 is in the standby state, the power state control unit 43 maintains the printer unit 24 in the quiet state.

S3: Next, the power state control unit 43 of the device control application 32 transmits a standby recovery request to the printer unit 24 via the first communication unit 41 (by using the MIB). The standby recovery request is to request the printer unit 24 to return back to the standby state, regardless of the current power state. Step S3 is performed immediately after the device control application 32 starts to run, but after step S6, explained later, is executed, step S3 is performed only in a case where the device control application 32 cannot confirm that the printer unit 24 is in the standby state.

In response to the standby recovery request, the power state control unit 43 of the device control application 32 receives a success in the request or failure of the request from the printer unit 24, or determines failure of communication. The success in the request indicates that the printer unit 24 has returned back to the standby state. The failure of the request is returned when communication is successfully performed but the printer unit 24 cannot return back to the standby state. For example, the printer unit 24 may fail to return back to the standby state because of an open door and the like. The failure of communication indicates that the first communication unit 41 cannot communicate with the second communication unit 44. For example, failure of communication occurs when the device 20 is in the OFF state or when the USB cable or the LAN cable is disconnected.

S4: In a case where the standby recovery request fails, or communication fails, the power state control unit 43 of the device control application 32 waits for a certain period of time (for example, one second), and repeats the standby recovery request of step S3.

S5: In a case where the standby recovery request is successfully completed, the power state control unit 43 of the device control application 32 waits for a certain period of time (for example, one second).

S6: The power state obtaining unit 42 of the device control application 32 sends an inquiry for the power state to the printer unit 24 via the first communication unit 41 (via the MIB).

S7: In a case where the power state of the printer unit 24 is in the standby state, it is confirmed that the power state of the printer unit 24 is in the standby state, and accordingly, the processing of FIG. 9 exits the loop.

S8: In a case where the power state of the printer unit 24 is a state other than the standby state, the power state control unit 43 of the device control application 32 waits for a certain period of time (for example, one second), and repeats the standby recovery request of step S3. The reason why the power state control unit 43 waits for a certain period of time is to alleviate an increase in the communication load.

S9, S10: In a case where it is confirmed that the power state of the printer unit 24 is in the standby state, the power state control unit 43 of the device control application 32 uses the first communication unit 41 (uses the MIB) to repeatedly transmit a quiet state keep request (a control request to transition to a power state defined in advance) to the printer unit 24 with certain intervals. The quiet state is a power state of the lowest power consumption from among the power states in which the supply of power from the printer unit 24 to the scanner unit 21 is not stopped. Therefore, the power consumption of the printer unit 24 can be reduced while the printer unit 24 is maintained in the power state in which the supply of power from the printer unit 24 to the scanner unit 21 is not stopped. Note that the power state control unit 43 may be maintained in the standby state or may be maintained in the power-saving state.

Certain intervals may be shorter than a time period for the power state of the printer unit to transition from the quiet state to the engine OFF.

Alternatively, instead of repeatedly transmitting the quiet state keep request to the printer unit 24 with certain intervals, the power state control unit 43 may transmit to the printer unit 24 a limiting request for limiting transition to a power state that is lower in power consumption than the quiet state. In this case, the power state control unit 43 transmits to the printer unit 24 a request for cancelling the limiting request when the device control application 32 quits (i.e., the terminal apparatus 30 shuts down, hibernates, or sleeps). Therefore, when the user no longer uses the device control application 32 or when the printer unit 24 finishes execution of the job, the printer unit 24 can transition to the power state of the low power consumption.

<Effects>

In the present embodiment, the device control application 32 that runs on the terminal apparatus 30 maintains the printer unit 24 in the power state in which the supply of power from the printer unit 24 to the scanner unit 21 is not stopped, and accordingly, the user is less likely to be prevented from using the scanner unit 21. For example, while the scanner unit 21 is being used, the printer unit 24 is less likely to be in the power-saving mode to cut off the supply of power to the scanner unit 21 that is being used by the user. Furthermore, power-saving recovery of the scanner unit 21 can be performed in response to a document placed on a platen or a feeder to be scanned, or power-saving recovery can be performed in response to pressing of a hard key for the scanner function provided on the operation panel.

Second Embodiment

In the first embodiment, while the terminal apparatus 30 is in the ON state, the device control application 32 maintains the printer unit 24 in the quiet state, and accordingly, even when the user uses neither of the scanner unit 21 nor the printer unit 24, the power is consumed in the quiet state.

Figure 10:
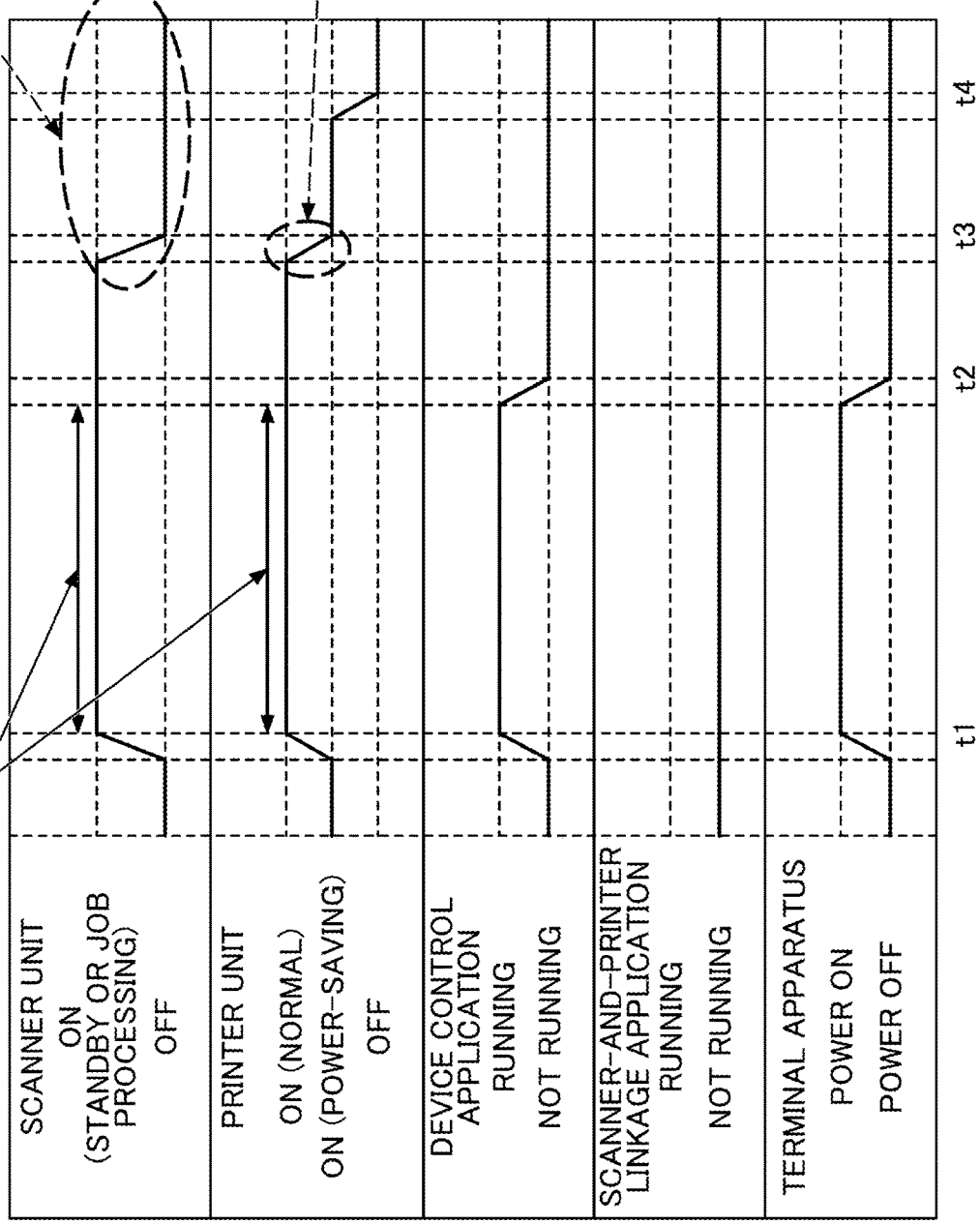
FIG. 10 is an example of a time chart of the power source of the printer unit according to a power state control method of a first embodiment.

FIG. 10 is an example of a time chart of the power source of the printer unit 24 according to a power state control method of the first embodiment.

(i) At a time t1, the user turns ON the terminal apparatus 30, and accordingly, the device control application 32 automatically starts to run. The device control application 32 causes the printer unit 24 to transition to the standby state to supply power to the scanner unit 21. The scanner-and-printer linkage application 31 does not run until it is started by the user.

(ii) At a time t2, the user turns OFF the terminal apparatus 30. When the terminal apparatus is turned OFF, the device control application 32 also quits. Accordingly, the quiet state keep request that is output from the device control application 32 to the printer unit 24 is no longer output. The power state management unit 46 of the printer unit 24 does not transition to a power-saving mode that is equal to or lower than the engine OFF state until a timeout occurs with the timer. Therefore, the scanner unit 21 continues to receive power.

(iii) At a time t3, the power state management unit 46 of the printer unit 24 transitions to the engine OFF state when a timeout occurs with the timer. Accordingly, the scanner unit 21 no longer receives power.

(iv) At a time t4, the user turns off the device 20.

For example, between the times t1 and t2, the device control application 32 starts to run together with the terminal apparatus 30, and accordingly, even in a period in which the user does not actually perform scanning or printing, power is supplied to the scanner unit 21 and the printer unit 24. Therefore, useless power may be consumed.

Therefore, in the present embodiment, when the scanner-and-printer linkage application 31 is running, the device control application 32 maintains the printer unit 24 in the quiet state. In a case where the user uses either the scanner unit 21 or the printer unit 24 or uses both, the scanner-and-printer linkage application 31 is started to run, and therefore, when the user uses either the scanner unit 21 or the printer unit 24 or uses both, the device control application 32 maintains the printer unit 24 in the quiet state. In a case where the user uses neither the scanner unit 21 nor the printer unit 24, the printer unit 24 can transition to the engine OFF state or the STR state, so that the power consumption can be reduced.

In the present embodiment, the quiet state is maintained when the scanner-and-printer linkage application 31 is running. Therefore, the device control application 32 automatically runs when the scanner-and-printer linkage application 31 is started.

<Functions>

Figure 11:
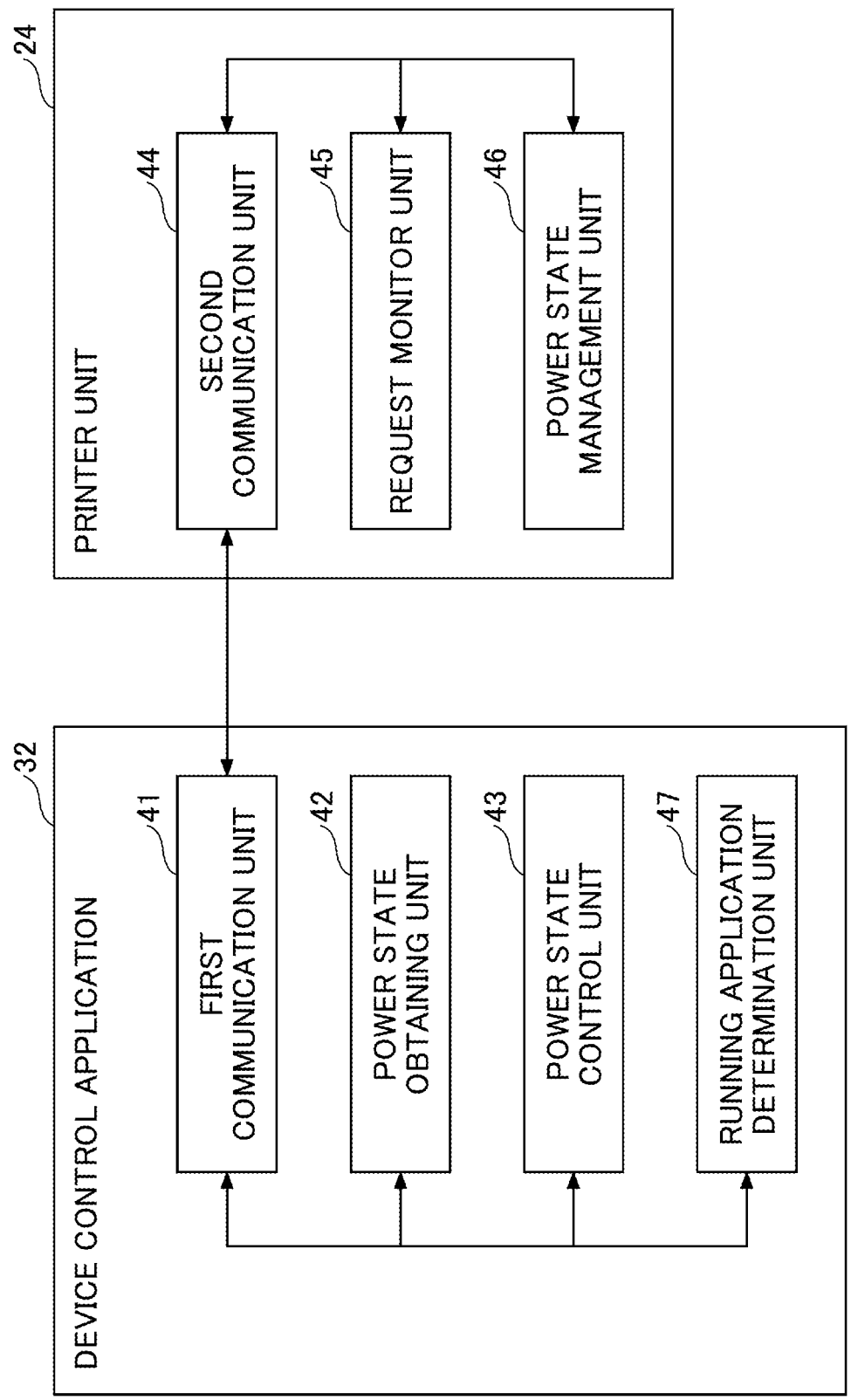
FIG. 11 is a diagram illustrating a functional configuration of an example of a printer unit and a device control application (a second embodiment).

FIG. 11 is a diagram illustrating a functional configuration of examples of the printer unit 24 and the device control application 32 according to the present embodiment. In the explanation of FIG. 11, the constituent elements denoted with the same reference numerals achieve substantially the same functions, and accordingly, only representing constituent elements of the present embodiment may be explained.

<<Device Control Application>>

In the present embodiment, the device control application 32 additionally includes a running application determination unit 47. For example, the running application determination unit 47 obtains from the OS 35 a list of applications that are running on the terminal apparatus 30, and determines whether the list includes the scanner-and-printer linkage application 31. In a case where the list includes the scanner-and-printer linkage application 31, the scanner-and-printer linkage application 31 is considered to be running on the terminal apparatus 30. The running application determination unit 47 transmits to the power state control unit 43 a notification that the scanner-and-printer linkage application 31 is running or not running. In a case where the power state control unit 43 receives a notification that the scanner-and-printer linkage application 31 is running, the power state control unit 43 maintains the printer unit 24 in the quiet state.

<Sub-States of USB Power-Saving Recovery Request State and Network Power-Saving Recovery Request State>

Figure 12:
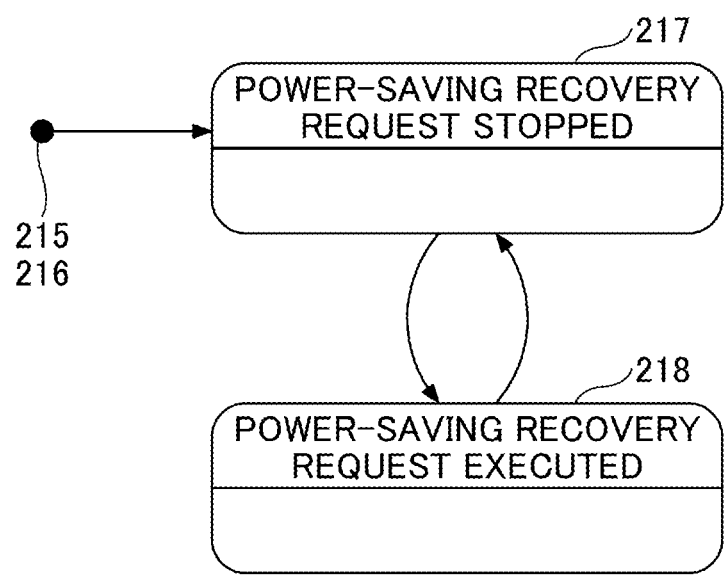
FIG. 12 is a diagram illustrating a sub-state of a universal serial bus (USB) power-saving recovery request state and a network power-saving recovery request state of the device control application.

In the present embodiment, in the USB power-saving recovery request state 215 and the network power-saving recovery request state 216, the quiet state keep request is not transmitted in some cases. Therefore, the USB power-saving recovery request state 215 and the network power-saving recovery request state 216 have sub-states. FIG. 12 shows sub-states of the USB power-saving recovery request state 215 and the network power-saving recovery request state 216 of the device control application 32.

The USB power-saving recovery request state 215 and the network power-saving recovery request state 216 include a power-saving recovery request stop state 217 and a power-saving recovery request execution state 218. In the power-saving recovery request stop state 217, the device control application 32 does not transmit the quiet state keep request to the printer unit 24. Only in the power-saving recovery request execution state 218, the device control application 32 transmits a quiet state keep request to the printer unit 24, similarly to the first embodiment.

Figure 13:
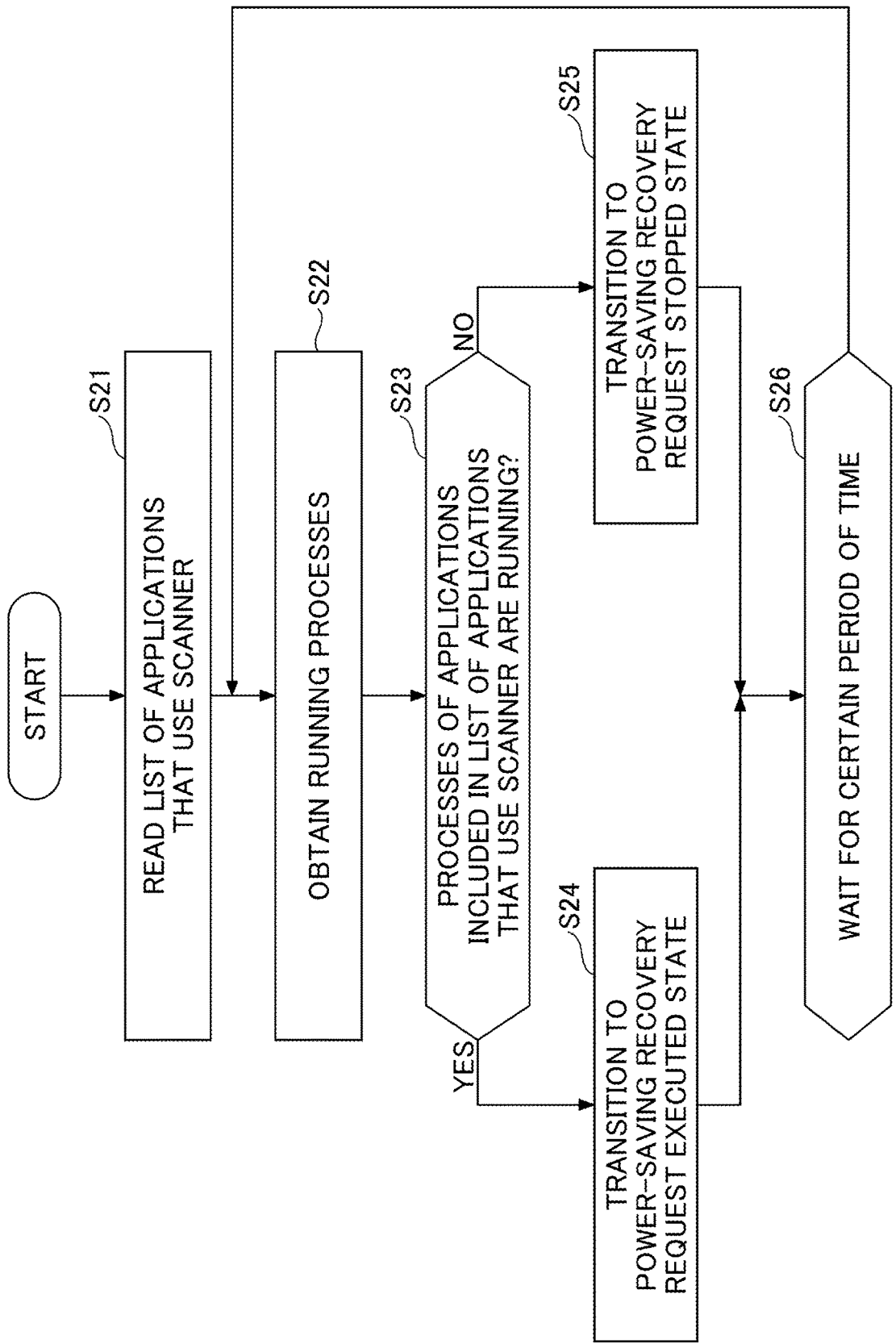
FIG. 13 is an example of a flowchart for explaining a procedure in which the device control application transitions to a power-saving recovery request execution state and a power-saving recovery request stop state.

FIG. 13 is an example of a flowchart for explaining a procedure in which the device control application 32 transitions to the power-saving recovery request execution state 218 and the power-saving recovery request stop state 217. For example, the processing of FIG. 13 starts when the device control application 32 starts to run.

First, the device control application 32 stores a list of applications that use the scanner, such as the scanner-and-printer linkage application 31, prepared in advance. The list may be set in advance by the manufacturer when the scanner-and-printer linkage application 31 is shipped, or may be added by the user with an interface of the scanner-and-printer linkage application 31 or with a user configuration screen. The device control application 32 reads this list (S21).

FIG. 14 is a diagram illustrating an example of the list of applications that use the scanner. In the list, the names of applications are registered in generic terms. The OS 35 recognizes these applications as the name of processes. Therefore, the device control application 32 can determine whether applications using the scanner are running by obtaining running processes from the OS 35 and searching the applications in the list.

Back to FIG. 13, next, the running application determination unit 47 obtains running processes from the OS 35 (S22).

The running application determination unit of the device control application 32 determines whether applications (processes) included in the list of applications that use the scanner are running (S23).

In a case where the determination in step S23 is Yes, the device control application 32 transitions to the power-saving recovery request execution state 218 (S24). In the power-saving recovery request execution state 218, the power state control unit 43 transmits a quiet state keep request to the printer unit 24.

In a case where the determination in step S23 is No, the device control application 32 transitions to the power-saving recovery request stop state 217 (S25). In the power-saving recovery request stop state 217, the power state control unit 43 does not transmit the quiet state keep request to the printer unit 24.

After waiting for a certain period of time (S26), the device control application 32 repeats the processing in step S22 and subsequent steps.

The processing performed after the device control application 32 starts to run is substantially the same as the processing of the first embodiment. Therefore, the sequence diagram according to which the device control application 32 controls the power state of the printer unit 24 is substantially the same as in FIG. 9.

<Time Chart of Power Source of Printer Unit According to Power State Control Method of the Present Embodiment>

Figure 15:
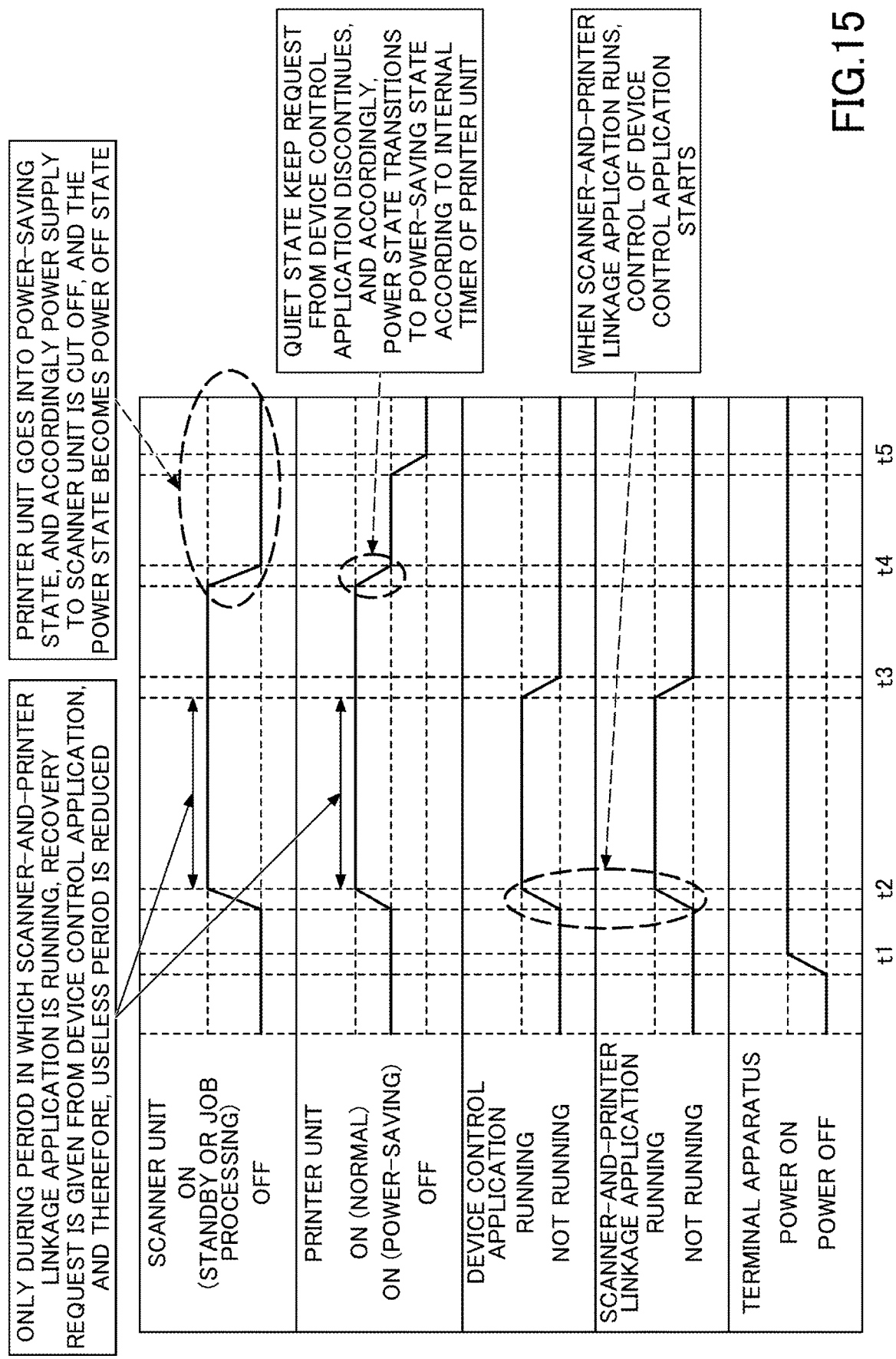
FIG. 15 is an example of a time chart of the power state of the printer unit according to a power state control method of the second embodiment.

FIG. 15 is an example of a time chart of the power state of the printer unit 24 according to the power state control method of the second embodiment.

(i) At a time t1, the user turns on the terminal apparatus 30. In the present embodiment, the device control application 32 does not automatically start to run.

(ii) At a time t2, the user starts the scanner-and-printer linkage application 31. When the scanner-and-printer linkage application 31 starts to run, the device control application 32 is started. Furthermore, the device control application 32 causes the printer unit 24 to transition to the standby state, so that the scanner unit 21 receives power.

(iii) At a time t3, the user stops the scanner-and-printer linkage application 31. When the scanner-and-printer linkage application 31 stops, the device control application 32 is stopped. Accordingly, the quiet state keep request that is output from the device control application 32 to the printer unit 24 is no longer output. The power state management unit 46 of the printer unit 24 does not transition to a power-saving mode that is equal to or lower than the engine OFF state until a timeout occurs with the timer. Therefore, the scanner unit 21 continues to receive power.

(iv) At a time t4, the power state management unit 46 of the printer unit 24 transitions to the engine OFF state when a timeout occurs with the timer. Accordingly, the scanner unit 21 no longer receives power.

(v) At a time t5, the user turns OFF the device 20.

For example, between the times t2 and t3, only when the scanner-and-printer linkage application is running, the device control application 32 transmits the quiet state keep request to the printer unit 24, and accordingly, a period of time in which power is uselessly consumed can be reduced.

<Effects>

In the present embodiment, in addition to the effects of the first embodiment, the device control application 32 starts and stops together with the scanner-and-printer linkage application 31, and in a case where an application that uses the scanner is running, the quiet state keep request is transmitted, and therefore, the power consumed by the scanner unit can be reduced more greatly than in the first embodiment.

According to the present disclosure, a recording medium storing a program with which a first element is less likely to lose supply of power can be provided.

<Other Examples of Applications>

Although the embodiments for carrying out the present invention have been described above, the present invention is not limited to the above-described embodiments, and various modifications and substitutions are made without departing from the subject matter described in the claims.

For example, in the explanation about the embodiments, the device 20 includes the printer unit and the scanner unit 21, but the embodiments are not limited thereto. The present invention can be applied to any device that includes at least two elements one of which receives power from the other of the two elements. Alternatively, power may be supplied from any given element to two or more elements. Still alternatively, power may be supplied from a first element to a second element, and further, power may be supplied from the second element to a third element.

Also, in the configuration example such as FIG. 7, the functions of the terminal apparatus 30 and the device 2 are roughly divided into the processing units in order to facilitate the understanding of processing performed by the terminal apparatus 30 and the device 2. The present disclosure is not limited by the way the functions are divided into the processing units or the names given to the processing units. The functions of the terminal apparatus 30 and the device 20 can be divided into a larger number of processing units depending on the processing content. Alternatively, the functions of the terminal apparatus 30 and the device 20 can be divided in such a manner that a single processing unit performs multiple types of processing.

The apparatuses, devices, and the like described above are merely an example of one of multiple computing environments for implementing the embodiment disclosed in this specification. In an embodiment, for example, the information processing system 40 may include multiple computing apparatuses configured as a server cluster. The multiple computing apparatuses are configured to communicate with each other via communication link of any given type including a network, a shared memory, and the like, and implement the processing disclosed in the present specification.

The functions of the embodiment described above can be implemented by one or a plurality of processing circuits. In this case, the "processing circuit" in this specification is assumed to include a processor programmed to execute the functions by software, such as a processor implemented by an electronic circuit, and devices designed to execute the functions described above, such as an application specific integrated circuit (ASIC), a digital signal processor (DSP), a field programmable gate array (FPGA), and conventional circuit modules.

Although the present invention has been hereinabove explained on the basis of the embodiments, the present invention is not limited to the particulars of the described examples. These features can be made without departing from the scope of the claimed subject matter, and can be appropriately determined according to the form of application.

What is claimed is:

1. A non-transitory computer-readable recording medium storing a program executable by an information processing apparatus configured to communicate with a device including a first element and a second element, the second element being configured to receive power from a power source, and the first element being configured to receive the power from the power source via the second element,
wherein the program includes instructions that when executed by a processor of the information processing apparatus cause the processor to determine whether an application that uses the first element is running, and
in response to determining that the application that uses the first element is running, the processor causes the information processing apparatus to control the second element such that the second element is maintained in a power state in which the second element supplies the power to the first element.

2. The non-transitory computer-readable recording medium according to claim 1, wherein the information processing apparatus is configured to repeatedly transmit to the second element a request for controlling the second element such that the second element is maintained in a power state defined in advance.

3. The non-transitory computer-readable recording medium according to claim 2, wherein the power state defined in advance is a first power state, the first power state being one of a plurality of power states to which the second element transitions, the first power state being a power state of a lowest power consumption in which supply of the power from the second element to the first element does not stop.

4. The non-transitory computer-readable recording medium according to claim 1, wherein the information processing apparatus is configured to transmit to the device an instruction for prohibiting the second element from transitioning to a power state of a power consumption that is lower than a power consumption in a power state defined in advance.

5. The non-transitory computer-readable recording medium according to claim 1, wherein the program starts to run in response to the information processing apparatus being turned on.

6. The non-transitory computer-readable recording medium according to claim 1, wherein the processor determines that the application that uses the first element is running in response to determining that an application included in a list of applications that use the first element prepared in advance is included in running processes obtained from an operating system.

7. The non-transitory computer-readable recording medium according to claim 1, wherein the program starts to run in response to starting of the application.

8. The non-transitory computer-readable recording medium according to claim 1, wherein the first element is a scanner, and the second element is a printer.

9. A power state control method executable by an information processing apparatus configured to communicate with a device including a first element and a second element, the second element being configured to receive power from a power source, and the first element being configured to receive the power from the power source via the second element,
wherein the method comprises determining whether an application that uses the first element is running, and
in response to determining that the application that uses the first element is running, the method further comprising controlling the second element such that the second element is maintained in a power state in which the second element supplies the power to the first element.

10. A system comprising:

an information processing apparatus;

a device including a first element and a second element, the second element being configured to receive power from a power source, and the first element being configured to receive the power from the power source via the second element, wherein the information processing apparatus is configured to communicate with the device, wherein the information processing apparatus is configured to determine whether an application that uses the first element is running, and, in response to determining that the application that uses the first element is running, the information processing apparatus transmits to the device an instruction for controlling the second element such that the second element is maintained in a power state in which the second element supplies the power to the first element, and wherein in response to the instruction from the information processing apparatus, the device maintains the second element in the power state in which the second element supplies the power to the first element.

* * * * *